US012347003B2

(12) United States Patent
Jain et al.

(10) Patent No.: US 12,347,003 B2
(45) Date of Patent: Jul. 1, 2025

(54) COLLABORATIVE EDITING OF VECTOR GRAPHICS

(71) Applicant: Adobe Inc., San Jose, CA (US)

(72) Inventors: Vishwas Jain, Bengaluru (IN); Vineet Batra, Delhi (IN); Souymodip Chakraborty, Karnataka (IN); Kevin Wampler, Seattle, WA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 220 days.

(21) Appl. No.: 18/098,912

(22) Filed: Jan. 19, 2023

(65) Prior Publication Data

US 2024/0249454 A1 Jul. 25, 2024

(51) Int. Cl.
*G06T 11/60* (2006.01)
(52) U.S. Cl.
CPC ..................... *G06T 11/60* (2013.01)
(58) Field of Classification Search
CPC ............................. G06T 11/60; G06Q 10/101
USPC .................. 345/441, 522; 382/162; 715/751
See application file for complete search history.

(56) References Cited

U.S. PATENT DOCUMENTS

| | | | | |
|---|---|---|---|---|
| 5,818,452 | A * | 10/1998 | Atkinson | G06T 19/20 345/441 |
| 9,218,102 | B1 | 12/2015 | Greenspan et al. | |
| 10,554,713 | B2 * | 2/2020 | Smith | G06F 3/16 |
| 2006/0147110 | A1 * | 7/2006 | Munsil | H04N 1/4053 382/162 |
| 2012/0110445 | A1 | 5/2012 | Greenspan et al. | |
| 2012/0284635 | A1 * | 11/2012 | Sitrick | G06T 1/0007 715/751 |
| 2014/0152665 | A1 | 6/2014 | Lu et al. | |
| 2014/0324879 | A1 * | 10/2014 | Trease | G06F 16/951 707/756 |
| 2015/0222730 | A1 * | 8/2015 | Gower | H04L 65/70 709/203 |
| 2019/0364108 | A1 | 11/2019 | Berger et al. | |
| 2020/0412795 | A1 | 12/2020 | Lucco | |
| 2022/0328364 | A1 * | 10/2022 | Wang | H01L 21/67 |
| 2023/0367754 | A1 * | 11/2023 | Beri | G06F 16/2246 |

OTHER PUBLICATIONS

GB Application No. GB2317752.0 Combined Search and Examination Report, May 23, 2024, pp. 1-7.

(Continued)

*Primary Examiner* — Prabodh M Dharia
(74) *Attorney, Agent, or Firm* — Kilpatrick Townsend & Stockton LLP

(57) ABSTRACT

Graphical constructs are efficiently described by integer-based identifiers, and graphical constructs of the same type are stored in a definitional component. Each client maintains both a pending state representation and a synchronized state representation of the graphical design to independently track the state of the representation at a live editing server. The use of integer-based identifiers for graphical constructs provides an efficient change representation that can be communicated with minimal network traffic. All copies of the graphical design represented among clients reach a consistent state quickly even when multiple users are making changes to the same vector path, eliminating the need to track changes manually or to move large files.

17 Claims, 10 Drawing Sheets

(56) References Cited

OTHER PUBLICATIONS

Wallace, Evan, CTO at Figma, "Realtime Editing of Ordered Sequences", https://www.figma.com/blog/realtime-editing-of-ordered-sequences/, Mar. 2017, pp. 1-7.
Bath, Ulrike, et. al. "CERVI: collaborative editing of raster and vector images", The Visual Computer, 38, https://doi.org/10.1007/s00371-022-02522, Jun. 2022, pp. 4057-4070.
Briggs, Preston, et al., "An Efficient Representation for Sparse Sets", ACM Letters on Programming Languages and Systems, vol. 2, No. 1-4, Mar. 1993, pp. 59-69.
Asente, Paul, et al., "Dynamic Planar Map Illustration", ACM Transactions on Graphics, vol. 26, No. 3 [retrieved Apr. 3, 2023]. Retrieved from the Internet <https://doi.org/10.1145/1276377.1276415>., Jul. 29, 2007, 10 pages.
Warnock, John, et al., "A device independent graphics imaging model for use with raster devices", ACM SIGGRAPH Computer Graphics, vol. 16, No. 3 [retrieved Apr. 3, 2023]. Retrieved from the Internet <https://www.tech-insider.org/software/research/acrobat/8207.pdf>., Jul. 1, 1982, 7 Pages.
GB Application No. GB2317752.0, Examination Report Mailed on Mar. 25, 2025, 5 pages.
Wikipedia, "Collaborative Real-Time Editor", en.wikipedia.org, available online at https://en.wikipedia.org/w/index.php?title=Collaborative_real-time_editor&oldid=1120614083, 2022, accessed Mar. 20, 2025, pp. 1-5.

\* cited by examiner

COLLABORATIVE EDITING OF VECTOR GRAPHICS

TECHNICAL FIELD

The present disclosure generally relates to graphic design using vector-based computer graphics. More specifically, but not by way of limitation, the present disclosure relates to techniques for collaborative editing of vector graphic representations.

BACKGROUND

Vector graphics is one of the most powerful, and versatile forms of graphic design. Vector graphics can be used to represent a wide variety of content, such as icons, logos, fonts, maps, posters, etc. in a resolution independent fashion. A vector graphics application defines standard representations for Bezier curves, text, images, meshes etc. Most vector graphics representations are inherently linear, i.e., the order in which constructs are stored necessarily defined, at least to some extent, their relationship with one another. The order can also determine how operations need to be performed on represented constructs. For example, if a point is to be inserted at a Bezier curve, dividing the curve in two, the point must necessarily be inserted at the appropriate place in an "anchor points" array that corresponds to the vector path. Once operations have been performed in the correct order to achieve a desired representation, the representation can be stored in a file, which can be accessed in the future for further work by any graphical designer using a vector graphics application.

SUMMARY

Certain aspects and features of the present disclosure relate to collaborative editing of vector graphical representations. For example, a method involves receiving, at a first client application among client applications, a command corresponding to an input delta of a vector path for a graphical design. The command includes a component defining a type of vector graphics entity. The method further includes transmitting the input delta of the vector path from the client application to a live editing server, and receiving, from the live editing server, an acknowledgement of the input delta and one or more additional deltas from at least a second client application from among the client applications. The method includes serially merging, in response to the acknowledgement and the one or more additional deltas, the input delta and one or more additional deltas into a synchronized version of the graphical design. The synchronized version represents an editing state of the graphical design. The method can also include displaying the graphical design with the deltas applied.

Other embodiments include corresponding computer systems, apparatus, and computer programs recorded on one or more computer storage devices, each configured to perform the actions of a method.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
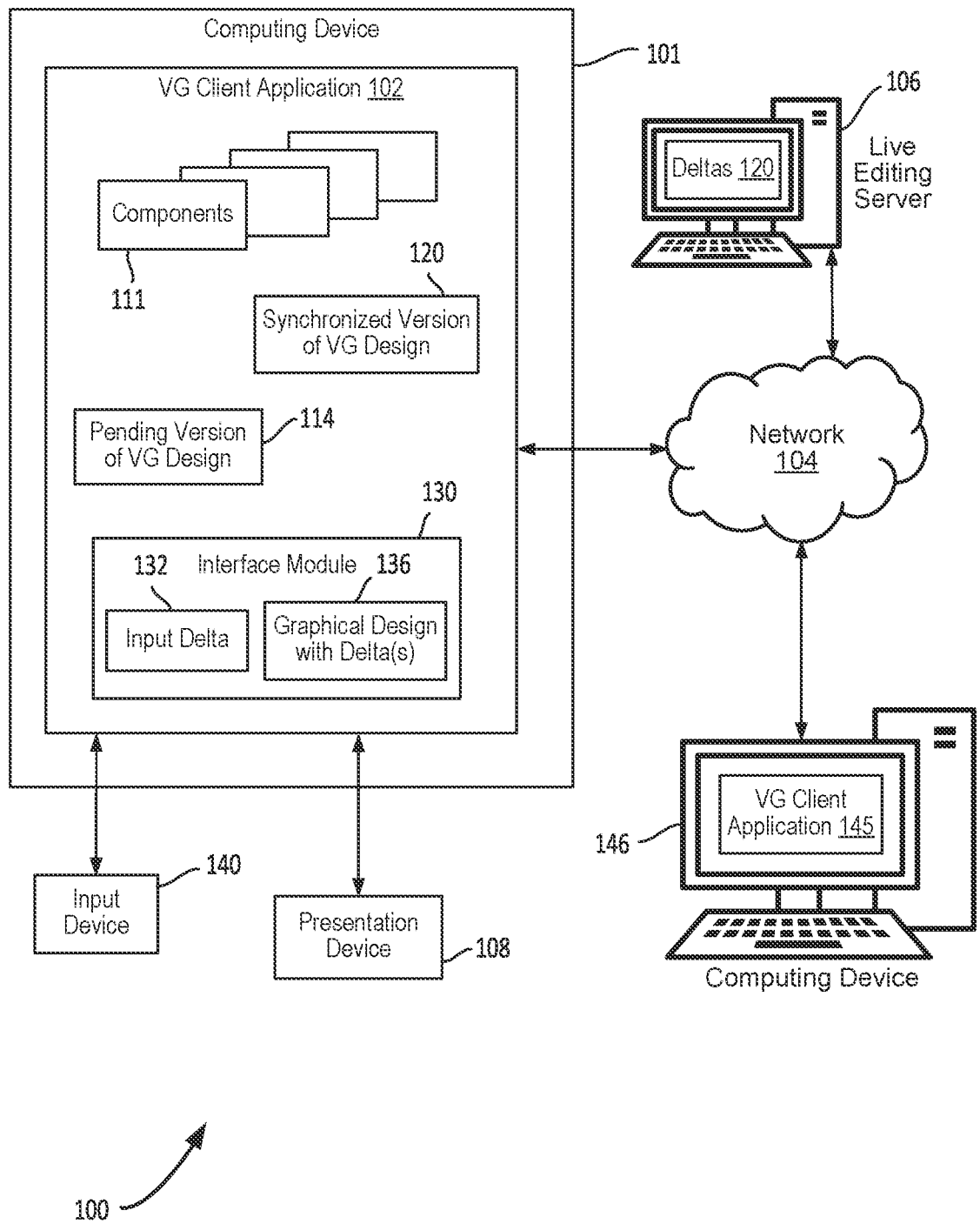
FIG. 1 is a diagram showing an example of a computing environment that provides collaborative editing of vector graphics according to certain embodiments.

Vector graphics-based representations exhibit a workflow in which the order of constructs define the constructs' relationship with one another. For example, if a point is to be inserted at a curve, dividing the curve in two, the point must necessarily be inserted at the appropriate place in an array that corresponds to the vector path. Once operations have been performed to achieve a desired representation, the representation of the graphical design can be stored in a file. Vector graphics-based representations are relatively easy to work with in isolated environments. However, where collaboration is desired, files are often stored on a server, with users manually tracking edits and the order of edits made by the other users. This tracking may become very difficult with complex representations. Alternatively, edits can be transferred to other users in real time using fractional indexing, which provides index values for sequential structures. The generation and storage of fractional indexing information can strain computing resources in the case of complex design representations, which may include hundreds of thousands of points.

Embodiments described herein address the above issues by providing a vector graphics entity component system (VG-ECS) that supports collaborative editing in real time or near real time. Graphical constructs are efficiently described by integer-based identifiers, and graphical constructs of the same type are stored in a definitional component. For example, points in a vector path are stored in a component. Similarly, lines are stored in a different component. Attributes, such as location and type, are stored in sparse sets within the software components. The sparse set representation provides for contiguous storage of values, establishing spatial coherence. Client graphics design applications communicate with a live editing server, and changes made by the various users are serialized and synchronized ("synced") via the live editing server. The efficient representation of graphical constructs supports fast reads and writes and provides for synchronization with minimal network traffic. A client maintains both a pending state representation and a synced state representation of the graphical design to independently track the state of the representation at the live editing server.

The use of integer-based identifiers for graphical constructs provides for a very efficient change (delta) representation that can be communicated with minimal network traffic. Copies of the graphical design representation among clients reach a consistent state very quickly even when multiple users are making changes to the same vector path, eliminating the need to track changes manually or to move large files. These efficient design representations facilitate efficient storage of graphical designs, providing for the maintenance of both synchronized and pending states of a design at client computing devices without straining processing and storage resources.

For example, a graphical design is loaded into a collaborative vector graphics application. The collaborative application may include a vector graphics client application that can be deployed to multiple end-user computing devices so that users can concurrently use the application. The application may also include a server-side application that is accessed through the client application. The server-side application causes the server computing device to function as a live editing server for all users. A command corresponding to a change to a vector path of the graphical design is received at a client application through a user interface. The change is transmitted from this client application to the live editing server and an acknowledgement is transmitted from the live editing server back to the client application.

The live editing server can also transmit, in the same manner as it transmits the acknowledgement, one or more additional changes as received from other instances or copies of the vector graphics client application being used by other users to edit the graphical design. All changes can be merged into a synchronized version of the graphical design. The synchronized version represents an editing state of the graphical design and can be displayed to users of the client applications either directly or indirectly.

In some examples, the command includes a component defining the type of vector graphics entity involved in the change. Attributes of the entity for the vector path are stored in a sparse set representation. Any construct within a component is configured to be uniquely referenced by an integer-based unique entity identifier, and the vector path is configured to be uniquely referenced by a vector path identifier.

In some examples, the input change to the vector path is applied to a stored, pending version of the graphical design. The pending version is used for display of the editing state of the graphical design. Once a synchronized state of the graphical design is established, the pending version can be set to the synchronized version.

FIG. 1 is a diagram showing an example of a computing environment 100 that provides collaborative editing of vector graphics according to certain embodiments. The computing environment 100 includes a computing device 101 that executes a vector graphics (VG) client application 102, a live editing server 106, a presentation device 108 that is controlled based on the VG client application 102 and input device 140 that receives input commands, which may include changes to a VG design. An additional computing device 146 includes VG client application 145. VG client application 102 and VG client application 145 are copies of a VG client application configured to work with live editing server 106. The computing devices 101 and 146, as well as live editing server 106 are communicatively coupled to each other using network 104. In this example, the VG client application 102 includes components 111, each of which stores constructs or entities used in an active VG design. VG client application 102 also includes a pending version 114 of an active VG design and a synchronized version 120 of an active VG design. An "active" VG design in this context refers to a design in the process of being collaboratively edited. VG client application 145 in computing device 146 includes the same or similar stored versions of the active VG design as well as relevant components. A copy 142 of the synchronized version of the active VG design also resides on live editing server 106.

In the example of FIG. 1, VG client application 102 also includes an interface module 130. In some embodiments, the VG client application 102 uses input from input device 140, for example, a keyboard, mouse, or trackpad, to receive input changes (deltas) such as input delta 132 to the active VG design. The VG client application 102 can display the active graphical design 136 with deltas input at computing device 101 through input device 140 and deltas input at commuting device 146 using VG client application 145. Instances of the VG client application can be implemented on many diverse kinds of computing devices.

Figure 2:
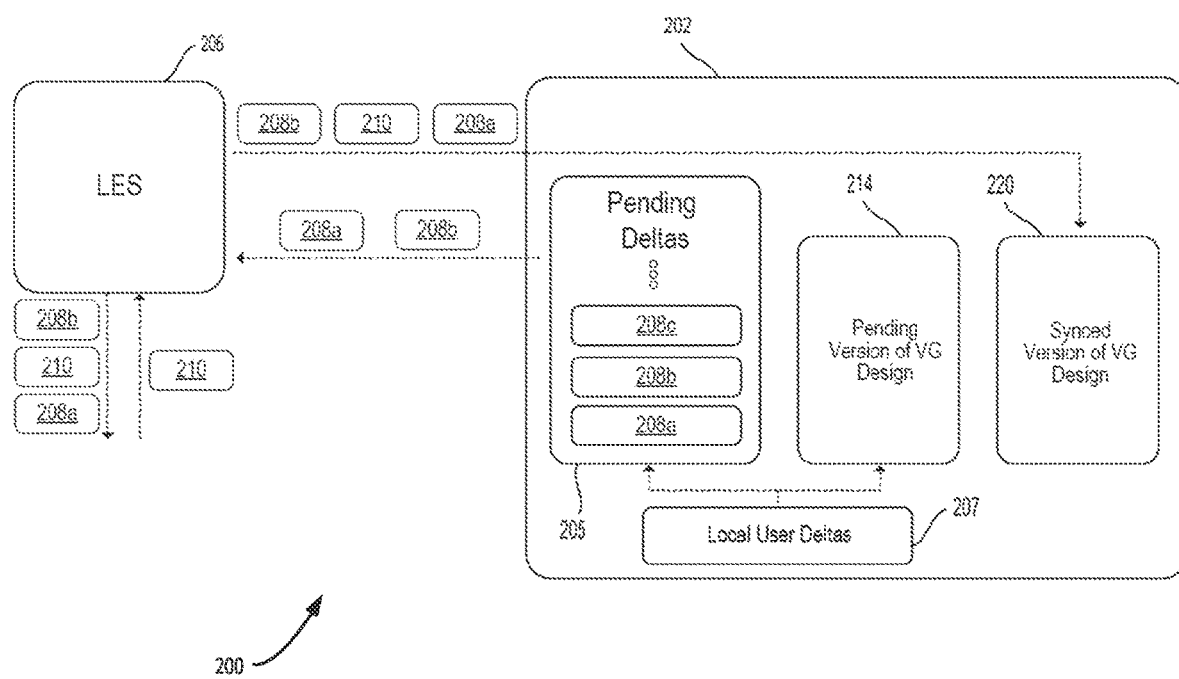
FIG. 2 is an example of a system for collaborative editing of vector graphics according to certain embodiments.

FIG. 2 is an example of a system 200 for collaborative editing of vector graphics according to certain embodiments. System 200 includes a VG client application 202 and a live editing server (LES) 206. The client application 202 provides a vector path to and from LES 206. The vector path represents a serial path along which deltas can be applied in order as needed to perform the operations in represented constructs to achieve the desired result. A client application in this example includes two instances of a graphical design, a pending version such as pending version 214 and a synced version such as synced version 220. A copy-on-write paradigm can be used to optimize the storage for the two instances. The pending version represents the current state for a user, including changes that may not have been published or synced with the LES. The synced version corresponds to the changes that have been acknowledged by the LES. The changes are represented in the form of delta operations ("deltas").

With vector paths and clients as shown in FIG. 2, as local user deltas 207 are received as input, for example through input device 140, the local user deltas are applied to pending version 214 of the graphical design and become pending deltas 205. Instances of pending versions of the graphical design differ across client applications that are communicatively coupled, for example, through network 104. The changes from pending version 214 are merged to the synced version 220 after broadcasting and receiving acknowledgement from LES 206, ensuring a consistent state across all users. In this example, the pending version is used for rendering so that local changes are immediately reflected, for example, by outputting them to presentation device 108, whereas the synced version is used for serialization so that deltas are applied in the order required to achieve the change intended.

Continuing with FIG. 2, in the view shown, pending deltas 208a and 208b from client application 202 are forwarded to the LES 206. Pending delta 208c is waiting to be inserted in the data stream between client application 202 and LES 206. At the same time, pending delta 210 is received by LES 206 from one of the other communicatively coupled client applications (not shown). The LES then forwards the pending deltas back to clients serialized into the order received to bring synced versions of the graphical design to the correct state. In this example, LES 206 forwards delta 208a, delta 210, and delta 208b back to client application 202 to be applied to synced version 220 of the active graphical design.

Collaborative editing as described above with respect to FIG. 2 is built around the handling of deltas (changes). The pending version of the active graphical design can be denoted as $\Pi_{vg}$ and the synchronized version can be denoted as $\Sigma_{vg}$. Local operations performed on $\Pi_{vg}$ are reduced to a sequence of commands, and this sequence of commands together constitutes a delta. Each operation that is applied to the $\Pi_{vg}$ and can be rendered immediately on screen by the local client application. The delta of the operation can be assigned a unique identifier and can then be appended to a list of pending deltas and sent to the LES. The LES can send back an ordered sequence of deltas. The LES sequentially orders changes from multiple clients to provide a sequence that is authoritative with respect to eventually providing an accurate synchronized state of the active design for all clients. If the sequence of deltas matches the sent deltas, then $\Pi_{vg}$ can be copied to $\Sigma_{vg}$ and the list of pending deltas can be purged. Otherwise, if the LES interleaves another user's deltas into the change stream, then the deltas received from the LES can be applied to $\Sigma_{vg}$, which can then be copied to $\Pi_{vg}$. Any remaining pending deltas, which have not yet been received back from the LES, can be reapplied to $\Pi_{vg}$.

Local operations performed on Πvg can be reduced to a sequence of commands. In one example, there can be three kinds of commands: an insert command; a modify command; and a delete command.

An insert command in this example can be used to create new entities. The insert command can specify the component in which to create a new entity, value(s) of the primary attribute for a new entity, and IDs of new entities. A modify command in this example can be used to modify attribute value(s) of existing entities. The modify command can specify the component in which to modify an entity, the attribute(s) to modify, the entity ID and the new value(s). A delete command in this example can be used to erase existing attribute values of an entity or the entity itself. The delete command can specify a component from which to delete an entity or attributes and attribute(s) to delete. If no attributes are specified, the entity itself is deleted. The delete command also specifies relevant entity ID(s).

Figure 3:
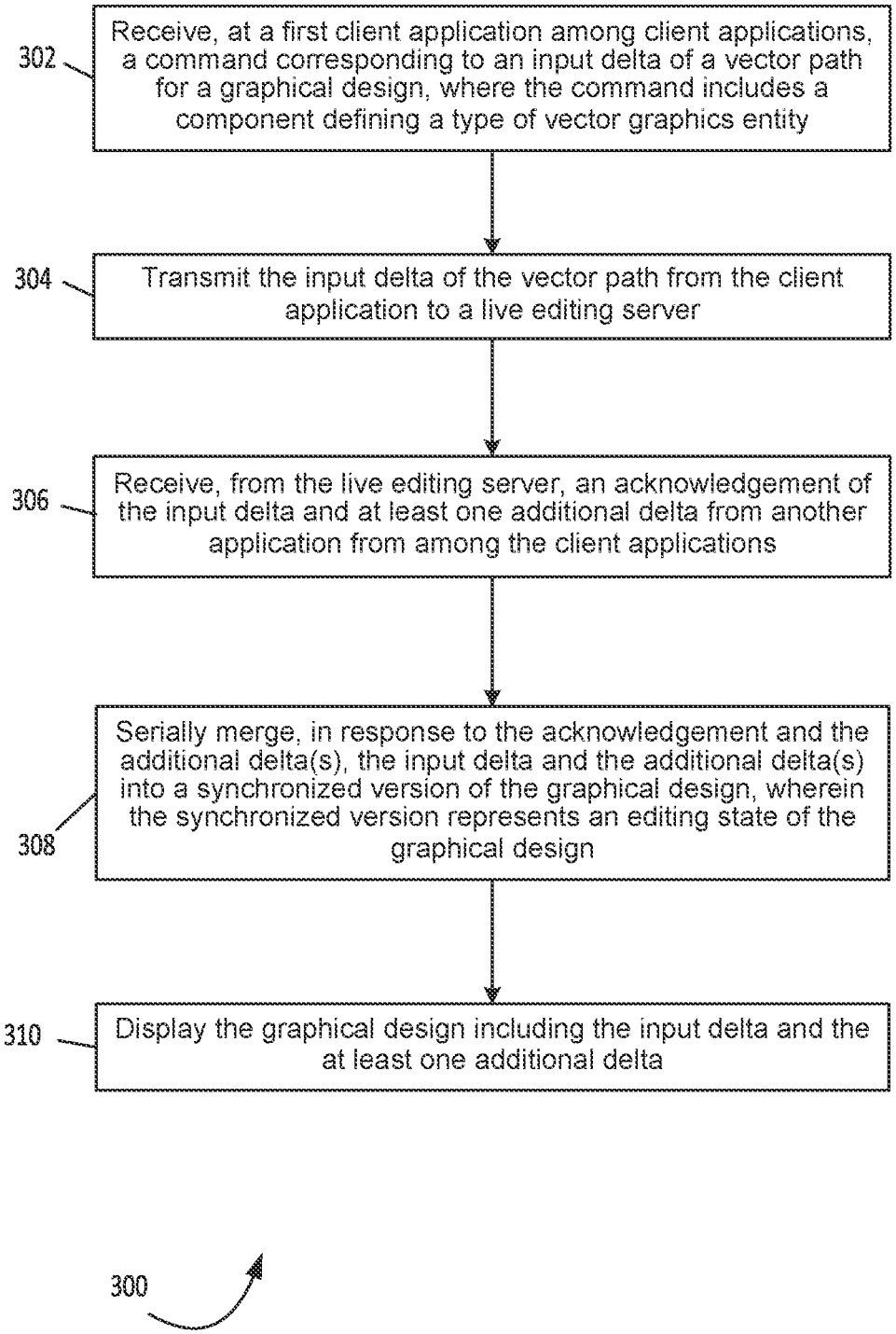
FIG. 3 is a flowchart of an example of a process for collaborative editing of vector graphics according to certain embodiments.

FIG. 3 is a flowchart of an example of a process 300 for collaborative editing of vector graphics according to certain embodiments. In this example, a computing device carries out the process by executing suitable program code, for example, computer program code for an application, such as client vector graphics application 102. At block 302, the computing device receives, at a first client application from among multiple client applications, a command corresponding to an input delta of a vector path for the graphical design. The command includes a component defining a type of vector graphics entity.

Path attributes such as points and primitives can be stored as components in a VG-ECS. In addition, the properties of these components (such as location or type of a point, or the endpoints of a line) can be stored as attributes. These attributes can use contiguous storage and can be represented as sparse sets. All constructs (or entities) of an VG-ECS of the same type can be stored together in a single component. For example, all points of a vector path can be stored in a single component, similarly all lines can be stored in another component. All the attributes (e.g., location, type, etc.) of a construct (e.g., a line, a point) can be stored in separate (contiguous) sparse-set arrays inside the component.

Continuing with FIG. 3, at block 304, the computing device transmits the input delta of the vector path from the client application to the live editing server (LES), for example LES 206. At block 306, the computing device receives, from the live editing server, an acknowledgement of the input delta and at least one additional delta from at least a second client application from among client applications. LES 206 can serialize deltas from multiple client applications and transmit them back to the clients. Serialization results in the order required to bring a client's synced version of the graphical design to the correct state. At block 308, the computing device merges, in the serialized order and in response to the acknowledgement of its own delta and the receipt of additional deltas, the input delta and the additional deltas into a synchronized version of the graphical design. The synced version represents an editing state of the graphical design as known to the live editing server. At block 310, the computing device can display the graphical design including the input delta and any other deltas.

In some examples, each component, entity, or attribute can be uniquely referenced using an identifier (ID). These IDs are unique within an instance of the VG-ECS. To uniquely identify a vector path entity, a pair of IDs can be used. Namely, an ID to identify the vector path containing the entity (unique ID) for a vector path, and an ID to identify the entity (or attribute) inside the vector path. The VG-ECS can have multiple components to store different kinds of entities. In some examples, each component can be identified by a component ID. For example, 12 bits can be used to represent a component to provide for a maximum of 4096 components per vector path.

Figure 4:
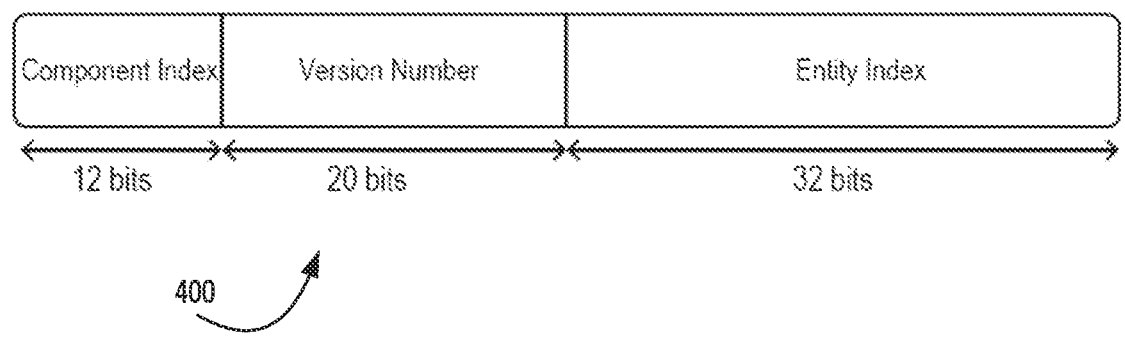
FIG. 4 is an example of an entity identifier as used in collaborative editing of vector graphics according to certain embodiments.

FIG. 4 is an example of an entity ID 400. Entity ID 400 stores a component index, which contains a value representing the entity in the component. In this example the component index is stored in the first 12 bits of the entity ID. As an example, the component index of a point entity ID identifies the component (namely, a points component), which contains the point. Entity ID 400 also stores an entity index, which in this example, is stored in the last 32 bits of the entity ID. The index in this example is an index of the attributes of the particular entity. For example, a point p whose entity index is 5, will have all its attribute values at index 5 in the attributes array of the point component. A version number is stored in the middle 20 bits of entity ID 400.

Figure 5:
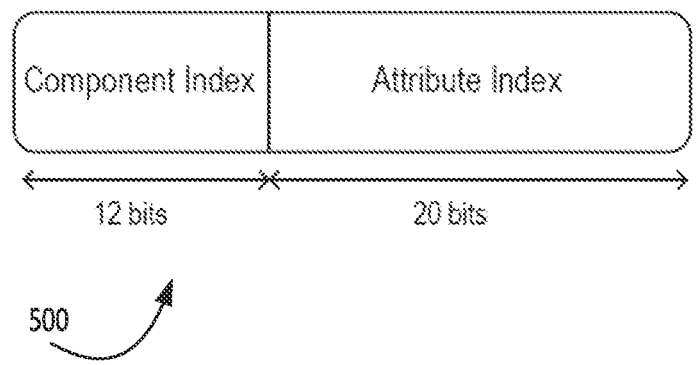
FIG. 5 is an example of an attribute identifier as used in collaborative editing of vector graphics according to certain embodiments.

FIG. 5 is an example of an attribute identifier 500 as used in collaborative editing of vector graphics according to certain embodiments. In this example, each component can store multiple attributes for the entities present inside it. The attribute ID is used to identify the attribute present inside a component. In this example, attribute ID 500 is 32 bits long, the first 12 bits identify the component, and remaining bits are used to identify the attribute.

Figure 6:
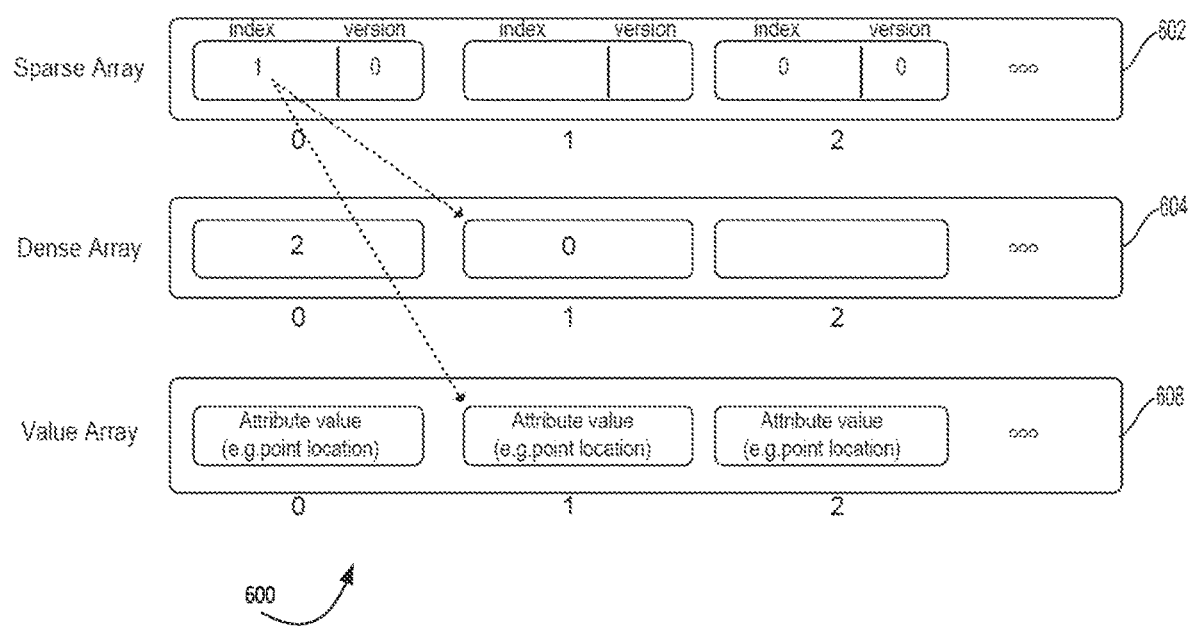
FIG. 6 is an example of a sparse set representation as used in collaborative editing of vector graphics according to certain embodiments.

FIG. 6 is an example of a sparse set representation 600 as used in collaborative editing of vector graphics according to certain embodiments. A component in the system can be implemented as a collection of sparse sets. A sparse set corresponds to an attribute and an entry in the set stores the attribute value of an entity present inside the component. For example, if two attributes, $A_1$ and $A_2$, are each represented by a sparse set, then the ith elements of these two sparse sets stores the $A_1$ and $A_2$ attribute values (respectively) of the ith entity. A sparse set provides contiguous storage for entity attributes, allowing read, write, and delete in O(1) time complexity.

The sparse set representation 600 in this example includes a sparse array 602, a dense array 604, and a value array 608. Entry at index i in the sparse array stores the index of the values array where its attribute value is stored. A sparse array entry also stores the version number that helps with the reuse of the indices. An element at index i in the dense array stores the index of the sparse array to provide for making delete operations in O(1) time complexity. In this manner, the dense array serves as a "reverse lookup" mechanism for the sparse array. An element at index i in the value array stores the actual value of the attribute. These relationships are indicated by the dotted arrows in FIG. 6.

Figure 7:
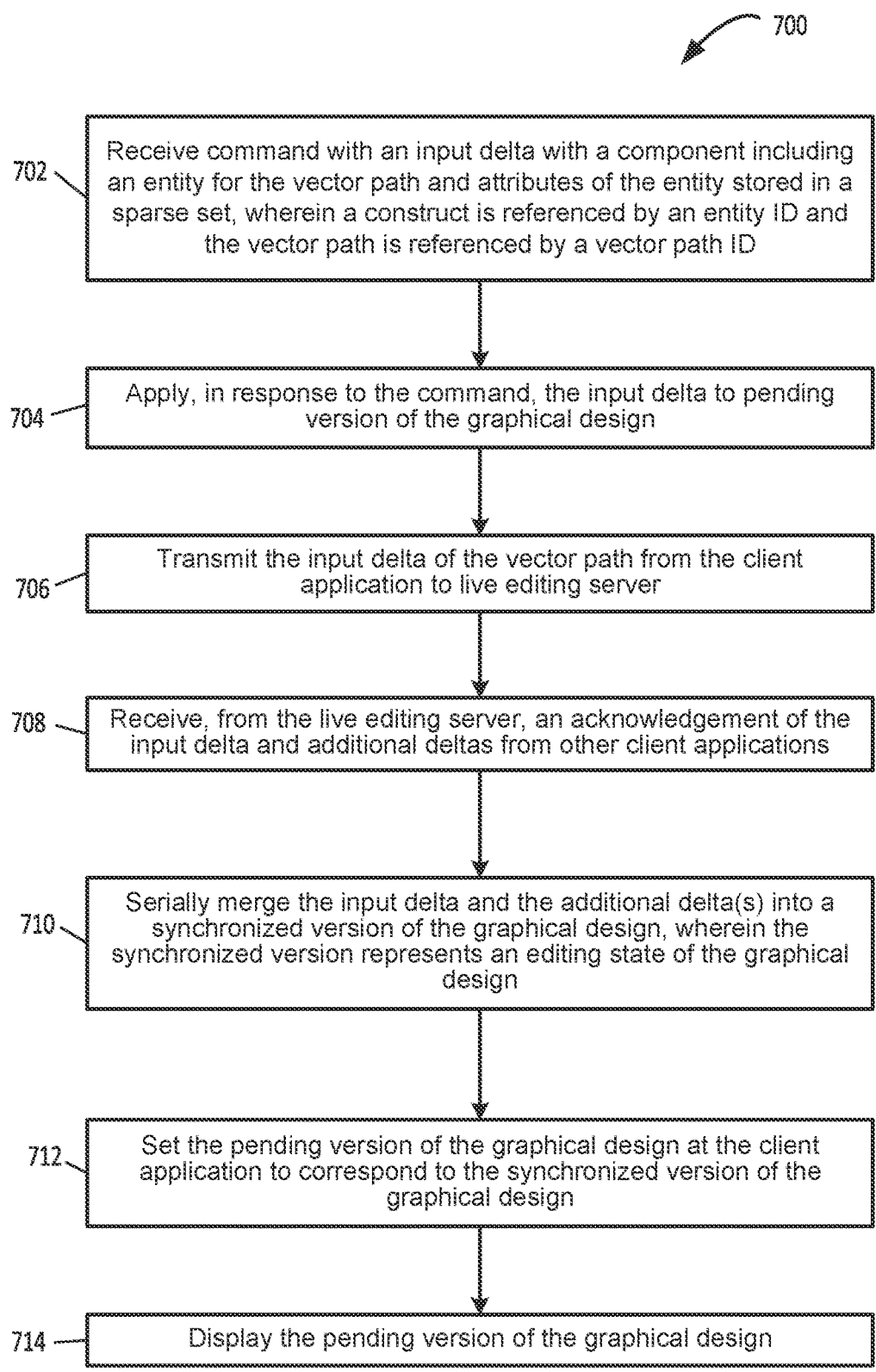
FIG. 7 is a flowchart of another example of collaborative editing of vector graphics according to certain embodiments.

FIG. 7 is another flowchart of another example of a process 700 for collaborative editing of vector graphics according to certain embodiments. In this example, one or more computing devices carry out the process by executing suitable program code. At block 702, the computing device receives a command with an input delta for a vector path in a graphical design. The delta includes a component that in turn includes an entity for the vector path and attributes of the entity stored in a sparse set. A construct in the component is referenced by an entity ID and the vector path is referenced by a vector path ID. At block 704, the computing device applies, in response to the command, the input delta to the pending version of the graphical design. At block 706, the computing device transmits the input delta of the vector path from the client application to the live editing server.

A component provides the ability to create a new entity and returns the ID of the newly created entity. At the time of an entity creation, the component assigns the next available free index value in the sparse array to the entity being created. The version number is incremented at this index inside the sparse array. An entity ID in this example includes the component index, the index in the sparse array, and the updated version number as returned.

Continuing with FIG. 7, at block 708, the computing device receives, from the live editing server, and acknowledgement of the input delta and additional deltas from other client applications. At block 710, the computing device serially merges the input delta and the additional deltas into a synchronized version of the graphical design. The synchronized version represents an editing state of the graphical design. Given an entity ID and attribute ID, the computing device can retrieve the attribute value for the entity as needed to merge changes. The attribute ID can be used to identify the sparse set array to query from. The index value present inside the entity ID can be used to get the value present inside the sparse array at this index. The functions included in block 704 through block 710 and discussed with respect to FIG. 7 can be used in implementing a step for serially merging, the input delta and at least one additional delta from at least a second client application into a synchronized version of the graphical design corresponding to an editing state of the graphical design as known to a live editing server.

In this example, the value in the sparse array contains a version number and the index value for the arrays. The given entity ID can be validated to ensure that the version number is correct, and to verify whether there exits any attribute value for the entity of interest. If the version number contained in the entity ID matches the version number contained in the sparse array, then this entity ID can be considered valid. Furthermore, if the value in the dense array at the index value provided by the sparse array is the same as the sparse array index, then the attribute for the entity exits, and can be retrieved from the values array. The entity ID validation check can be implemented as:

entity_id.version == sparse_array[entity_id.index].version, and the attribute existence check can be implemented as:

entity.id.index == dense_array[sparse_array[entity_id.index].version.

Vector paths can be persisted within the design by serializing the VG-ECS. Serialization can be achieved by serializing components, attributes, and entities, along with their IDs and values. The (de)serialization of data types can also be defined inside the VG-ECS. For example, the (de)serialization for a point location type can be accomplished using the code in the first code listing below. The second code listing depicts an example of a resulting JSON (JavaScript Object Notation) after serialization of a triangle.

```
(De)Serialization:
template <typename T>
JSON serialize (const T& value );
template <typename T>
void deserialize (T& value , const JSON & serialized_value );
template < >
JSON serialize <Point2f>(const Point2f & p) {
   return { p.x( ) , p.y( ) };
}
template < >
void deserialize <Point2f>(Point2f & p, const JSON & serialized_value )
{
   p.x = serialized_value [0];
   p.y = serialized_value [1];
}
JSON after Serialization of a Triangle:
{
   "components ":
   [
      {
         "name "; "point_component ",
         "ids": [ 0, 4294967296, 8589934592 ],
         "attributes ": [
            {
               "name ": "primary",
               "values": [ [0, 0], [100, 100], [100, 0] ]
            },
            {
               "name": "point_type ",
               "values": [ " vertex ", " vertex ", " vertex " ]
            }
         ]
      },
      {
         "name": "line_component",
         "ids": [ 1, 4294967297, 8589934593 ],
         "attributes": [
            {
               "name": "primary",
               "values": [ [0, 4294967296], [4294967296, 8589934592],
                  [8589934592, 0] ]
            }
         ]
      }
   ]
}
```

Staying with FIG. 7, at block 712, the pending version of the graphical design of the client application is set to correspond to the synchronized version of the graphical design. For example, the synchronized version may be copied to or overwrite the pending version as a new pending version. At block 714, the pending version of the graphical design is displayed. Entities can be deleted when no longer needed. In order to delete an entity, all its attributes can be deleted. Index values of deleted entities are stored in a list of free indices as an indication that they can be reused. Every time an entity index is reused, its version number can be increased to avoid conflicts between old and new values stored at the same entity index. After deletion, dense and value arrays remain compact, but sparse arrays are not guaranteed to be compact.

There are challenges in directly using entity IDs generated by the pending version inside commands when sending the commands to the LES. When a new entity is created inside the pending version of the graphical design, the ID that it is assigned is temporary. The entity IDs are an index into an array; thus, these temporary IDs are local and are not unique across clients. The entity however is eventually assigned a permanent, unique ID when the entity creation is synchronized in the form of deltas produced by the LES and applied to the synched graphical design. If the temporary ID assigned to the new entity by the client application based on the pending design is used inside the deltas sent to the server, then inconsistency may arise since these temporary IDs may not be valid after syncing with the LES.

The inconsistency described above results from the fact that the same local temporary ID may be used by some other client to create some other entity. In such a case, the permanent, unique entity ID that the newly created entity is assigned after synchronization will be different from the temporary ID. As an example, consider two clients A and B starting with a synchronized vector graphical design. Assume A creates a point $p_A$ that is assigned a local temporary entity ID $\eta^t$. At the same time, B creates another point $p_B$ that is assigned the same local temporary ID $\eta^t$. A also creates a line $l_A$ between an existing point $p_0$ and the new point $p_A$. A and B both send changes to the LES. Assume that the LES orders the deltas in such a way that when these deltas are synchronized with the $\Sigma_{vg}$ of A and B, $p_B$ and $p_A$ are assigned permanent IDs $\eta_1$ and $\eta_2$, respectively. However, line $l_A$ refers to the point $p_A$ using ID $\eta^t$, leading to inconsistency. There is no guarantee that $p_A$ will retain the same ID after ordering of the deltas by the LES, and in the scenario described above, the point is indeed assigned a different entity ID, and the line $l_A$ could either start referring to some other point (as in case described above), or in some cases may refer to a nonexistent point. A similar problem may be observed if an edit is made to an entity which has not yet been synched with the LES, for example, if $p_A$ was moved. After synchronization some other point may be moved. Thus, it is not feasible to directly use temporary IDs generated by $\Pi_{vg}$ for the newly created entities, as the IDs might not remain valid after changes are synchronized as an updated $\Sigma_{vg}$.

Figure 8:
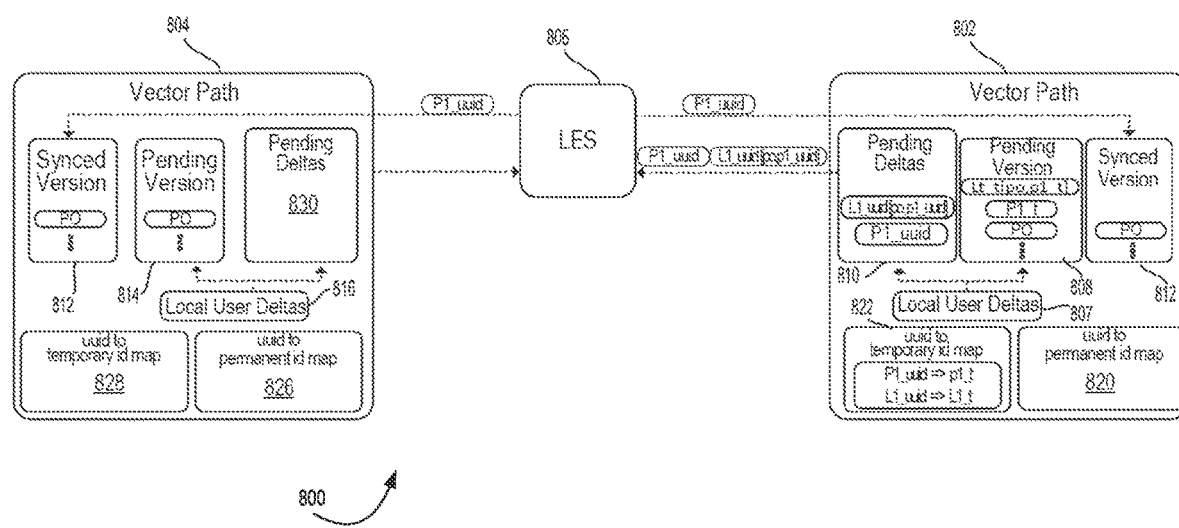
FIG. 8 is an example of an operation of a system ensuring unique and consistent identifiers for collaborative editing of vector graphics according to certain embodiments.
Figure 9:
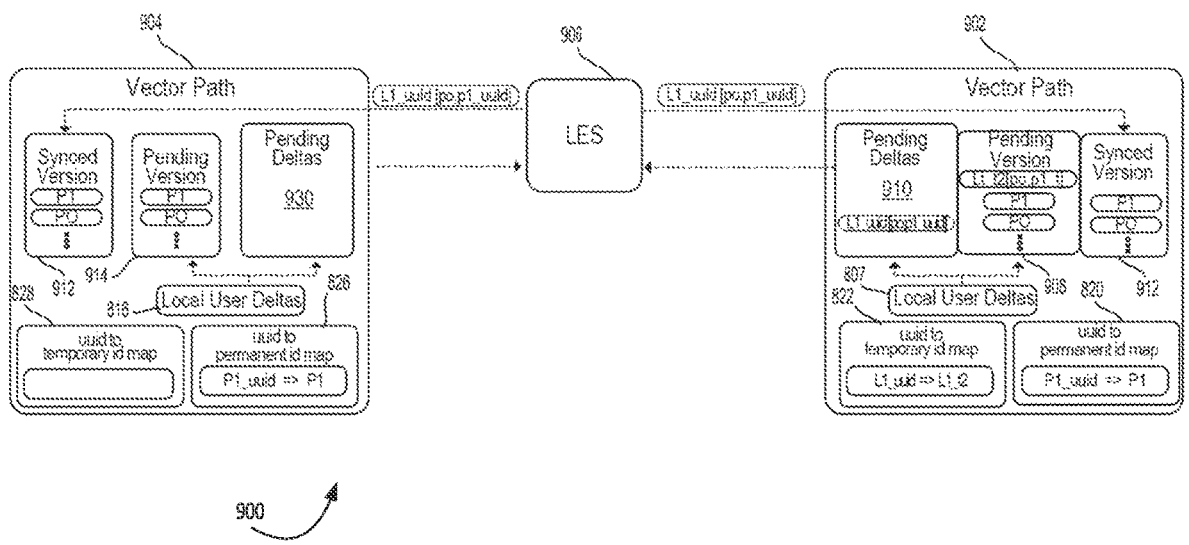
FIG. 9 is another example of an operation of a system ensuring unique and consistent identifiers for collaborative editing of vector graphics according to certain embodiments.
Figure 10:
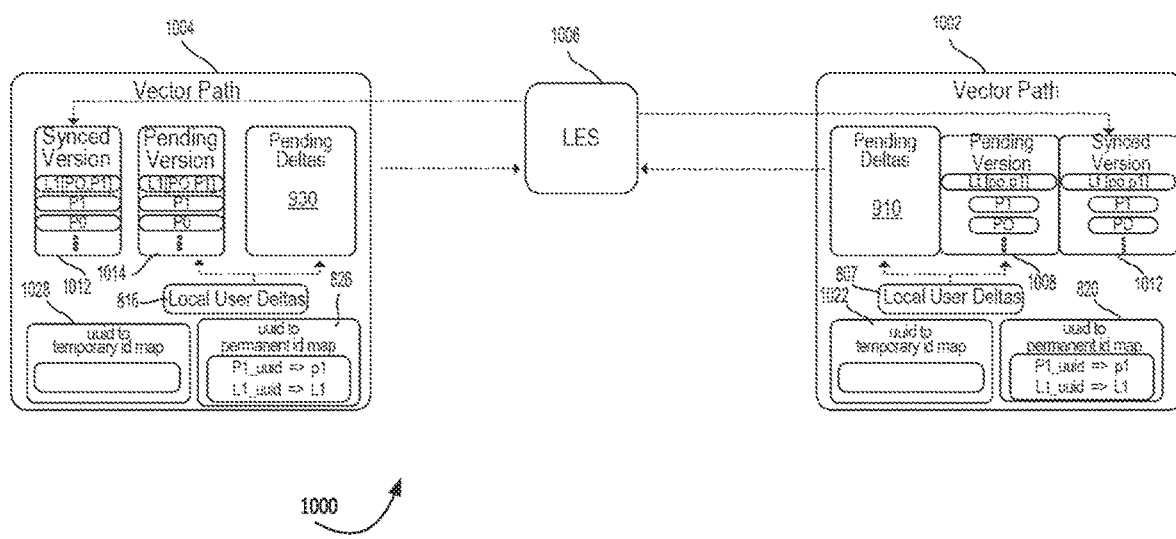
FIG. 10 is an additional example of an operation of a system ensuring unique and consistent identifiers for collaborative editing of vector graphics according to certain embodiments.

FIGS. 8-10 illustrate example operations involved in using a transient, universally unique identifier (uuid) to uniquely refer to entities sent to the LES. In these examples, uuids are 128 bits in contrast to entity IDs generated by the VG-ECS, which is 64 bits long in these examples. FIG. 8 is an example of an operation 800 of a system that ensures unique and consistent identifiers for collaborative editing of vector graphics according to certain embodiments. Operation 800 involves a vector path for client application 802, a vector path for client application 804, and a live editing server 806. To temporarily identify local user deltas 807, a new entity can be created inside pending version 808 ($\Pi_{vg}$) of client 802 with a temporary ID and a transient uuid. The uuid can be used to uniquely refer to this entity inside the pending deltas 810 sent to the LES 806, for example, P1_uuid and L1_uuid. When the entity is synchronized, synced version 812 ($\Sigma_{vg}$) obtains a permanent ID and the uuid is no longer needed.

A similar process can take place for client 804 in FIG. 8 with pending version 814 based on local user deltas 816. Client 802 and client 804 can each maintain a uuid-to-permanent ID map and a uuid-to-temporary ID map. Client 802 can maintain a uuid-to-permanent ID map 820 and a uuid-to-temporary ID map 822 as long as needed. Similarly, client 804 can maintain a uuid-to-permanent ID map 826 and a uuid-to-temporary ID map 828 as long as needed. Client 804 maintains pending deltas 830.

As a further illustration, let $\mathcal{T}$, $\mathcal{U}$, and $\mathcal{P}$ be the set of temporary IDs, set of uuids, and set of permanent IDs, respectively. In this case, every client application maintains two maps: $\varphi^t$: $\mathcal{U} \rightarrow \mathcal{T}$ and $\varphi$: $\mathcal{U} \rightarrow \mathcal{T}$, where: $\varphi^t$: $\mathcal{U} \rightarrow \mathcal{T}$ is an entity with temporary ID $\eta^t$ and uuid $\eta^u$, $\varphi^t(\eta^u)=\eta^t$; and $\varphi$: $\mathcal{U} \rightarrow \mathcal{P}$ is a synced entity with permanent ID $\eta$ and uuid $\eta^u$, $\varphi(u^u)=\eta$. As an example of the workflow, a new point $p_a$ and a line $l_a$ are created locally inside a pending VG-ECS and are assigned IDs $(\eta^t,\eta^u) \in \mathcal{T} \times \mathcal{U}$ and $(\zeta^t,\zeta^u) \in \mathcal{T} \times \mathcal{U}$, respectively, where $\varphi^t(\eta^u)=\eta^t, \varphi^t(\zeta^u)=\zeta^t$.

FIG. 9 is an example of the operation 900 for ensuring unique and consistent identifiers for collaborative editing of vector graphics according to certain embodiments. In the operation 900 of the entity creation process, LES 906 reorders the deltas which can change temporary IDs created by the client 902 and client 904, but the transient uuid is invariant relative to this re-ordering. Pending deltas 910 from client 902 and pending deltas 930 from client 904 can be applied to pending version 908 and pending version 914, respectively. When this entity is created in synced version 912 of the graphical design a permanent ID can be assigned and a mapping can be stored between the uuid and this new permanent entity ID.

In operation 900, the entities are referred to using the uuids. As deltas from the LES are applied to synchronized version 912, permanent VG-ECS entity IDs are assigned to them. The map $\varphi$ is updated to handle any future deltas, which may refer to these entities. For example, $\eta \in \mathcal{P}$ and $\zeta \in \mathcal{P}$ are permanent IDs and of the point $p_A$ and the line $l_A$, respectively. $\varphi(\eta^u)=\eta$ and $\varphi(\zeta^u)=\zeta$. The line $l_A$ refers to the point $p_A$ using $\varphi^t(\eta^u)$ before the sync and uses $\varphi(\eta^u)$ after the sync to refer to $p_A$.

FIG. 10 is an additional example of an operation 1000 for ensuring unique and consistent identifiers for collaborative editing of vector graphics according to certain embodiments. Client 1002 and client 1004 including pending version 1008 and pending version 1014, respectively. Upon receiving changes from LES 1006 and applying them to the synched version 1012 of the active vector graphical design, the transient uuid to temporary ID map is no longer needed and hence can be purged, resulting in empty maps 1022 and 1028.

When the client that created the entity receives back the delta containing the uuid for the entity, the client will remove its corresponding entry $\varphi^t$. At the end of the process, every client will be left with the same entries in the uuid-to-permanent ID map. For clean-up, since the client that created a particular entity sends out deltas referring to that entity by uuid, the client can send out an acknowledgement when all such deltas have been sent out so that corresponding entries from $\varphi$ for the clients can be deleted.

Figure 11:
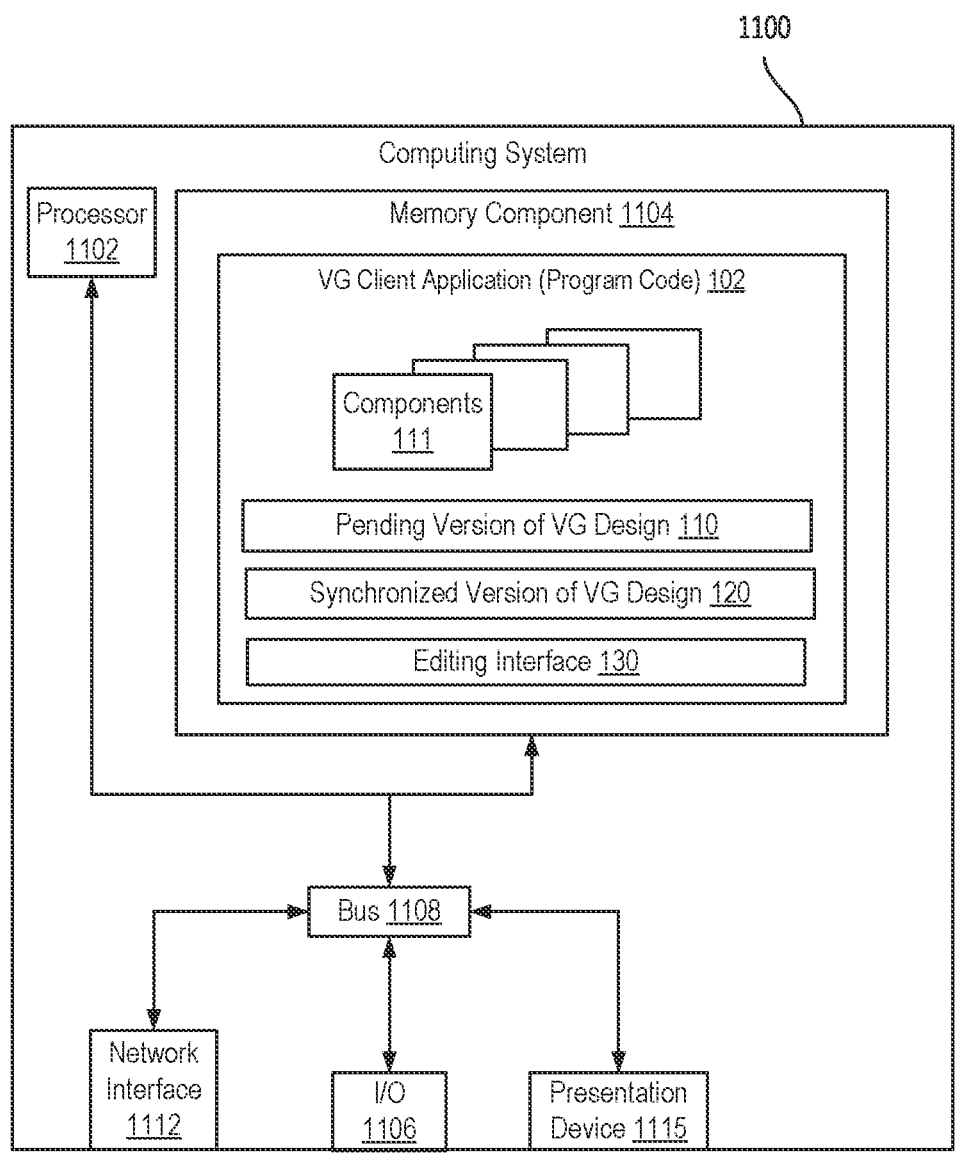
FIG. 11 is a diagram of an example of a computing system that provides collaborative editing of vector graphics according to certain embodiments.

FIG. 11 is a diagram of an example of a computing system 1100 that provides collaborative editing of vector graphics according to certain embodiments. System 1100 includes a processing device 1102 communicatively coupled to one or more memory devices. The processing device 1102 executes computer-executable program code stored in the memory component 1104. Examples of the processing device 1102 include a microprocessor, an application-specific integrated circuit ("ASIC"), a field-programmable gate array ("FPGA"), or any other suitable processing device. The processing device 1102 can include any number of processing devices, including a single processing device. The memory component 1104 includes any suitable non-transitory computer-readable medium for storing data, program code instructions, or both. A computer-readable medium can include any electronic, optical, magnetic, or other storage device capable of providing a processor with computer-readable, executable instructions or other program code. The memory component can include multiple memory devices to provide a computer-readable medium. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 11, the computing system 1100 may also include a number of external or internal devices, for example, input or output devices. For example, the computing system 1100 is shown with one or more input/output ("I/O") interfaces 1106. An I/O interface 1106 can receive input from input devices or provide output to output devices (not shown). Output may be provided using the interface module 130 of the VG client application 102. One or more buses 1108 are also included in the computing system 1100. The bus 1108 communicatively couples one or more components of a respective one of the computing system 1100. The processing device 1102 executes program code that configures the computing system 1100 to perform one or more of the operations described herein. The program code includes, for example, VG client application 102 or other suitable applications that perform one or more operations described herein. The program code may be resident in the memory component 1104 or any suitable non-transitory computer-readable medium and may be executed by the processing device 1102 or any other suitable processor. Memory component 1104, during operation of the computing system, can store the pending version 110 of the active vector graphical design, the definitional components 111, and the synchronized version 120 of the active vector graphical design.

The system 1100 of FIG. 11 also includes a network interface device 1112. The network interface device 1112 includes any device or group of devices suitable for establishing a wired or wireless data connection to one or more data networks. Non-limiting examples of the network interface device 1112 include an Ethernet network adapter, a wireless network adapter, and/or the like. The system 1100 can communicate with one or more other computing devices (e.g., another computing device executing other software, another computing device executing another copy or instance of the VG client application (not shown) via a data network (not shown) using the network interface device 1112. Network interface device 1112 can also be used to communicate with network or cloud storage used as a repository for designs as well as updated or archived versions of the vector graphics client application 102 for distribution and installation.

Staying with FIG. 11, in some embodiments, the computing system 1100 also includes the presentation device 1115. A presentation device 1115 can include any device or group of devices suitable for providing visual, auditory, or other suitable sensory output. In examples, presentation device 1115 displays input and/or rendered images. Non-limiting examples of the presentation device 1115 include a touchscreen, a monitor, a separate mobile computing device, etc. In some aspects, the presentation device 1115 can include a remote client-computing device that communicates with the computing system 1100 using one or more data networks. System 1100 may be implemented as a unitary computing device, for example, a notebook or mobile computer. Alternatively, as an example, the various devices included in system 1100 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "accessing," "generating," "processing," "computing," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. The endpoints of ranges as well as comparative limits are intended to encompass the notion of quality. Thus, expressions such as "less than" should be interpreted to mean "less than or equal to" and a range such as "from x to y" should be interpreted as "greater than or equal to x and less than or equal to y."

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
    receiving, at a first client application of a plurality of client applications, a command corresponding to an input delta of a vector path for a graphical design, the command including a component defining a type, and attributes, of a vector graphics entity, wherein the attributes are stored in a sparse set providing spatial coherence;
    transmitting the input delta of the vector path from the client application to a live editing server;
    receiving, from the live editing server, an acknowledgement of the input delta and at least one additional delta from at least a second client application from among the plurality of client applications;
    serially merging, in response to the acknowledgement and the at least one additional delta, the input delta and the at least one additional delta into a synchronized version of the graphical design, wherein the synchronized version represents an editing state of the graphical design; and
    storing the synchronized version of the graphical design, wherein the synchronized version as stored includes the input delta and the at least one additional delta.

2. The method of claim 1, further comprising applying, in response to the command, the input delta of the vector path to a pending version of the graphical design.

3. The method of claim 2, wherein displaying the graphical design further comprises:
    setting the pending version of the graphical design at the first client application to correspond to the synchronized version of the graphical design; and
    displaying the pending version of the graphical design.

4. The method of claim 1, wherein the component includes an entity for the vector path and attributes of the entity for the vector path.

5. The method of claim 1, wherein the sparse set further comprises:
    a values array;
    a sparse array including an index of the values array; and
    a dense array.

6. The method of claim 1, wherein:
    any construct within the component is configured to be uniquely referenced by an integer-based unique entity identifier; and
    the vector path is configured to be uniquely referenced by a vector path identifier.

7. A system comprising:
    a memory component; and
    a processing device coupled to the memory component, the processing device to perform operations comprising:
        receiving, at a first client application of a plurality of client applications, a command corresponding to an input delta of a vector path for a graphical design, the command including a component defining an entity for the vector path and attributes of the entity for the vector path, wherein the attributes are stored in a sparse set providing spatial coherence;
        transmitting the input delta of the vector path from the client application to a live editing server;
        receiving, from the live editing server, an acknowledgement of the input delta and at least one additional delta from at least a second client application from among the plurality of client applications;
        serially merging, in response to the acknowledgement and the at least one additional delta, the input delta and the at least one additional delta into a synchronized version of the graphical design, wherein the synchronized version represents an editing state of the graphical design; and
        storing the synchronized version of the graphical design, wherein the synchronized version as stored includes the input delta and the at least one additional delta.

8. The system of claim 7, wherein the operations further comprise displaying the graphical design including the input delta and the at least one additional delta.

9. The system of claim 7, wherein the operations further comprise applying, in response to the command, the input delta of the vector path to a pending version of the graphical design.

10. The system of claim 9, wherein the operation of displaying the graphical design further comprises:
    setting the pending version of the graphical design at the first client application to correspond to the synchronized version of the graphical design; and
    displaying the pending version of the graphical design.

11. The system of claim 7, wherein the sparse set further comprises:
    a values array;
    a sparse array including an index of the values array; and
    a dense array.

12. The system of claim 7, wherein:
    any construct within the component is configured to be uniquely referenced by an integer-based unique entity identifier; and
    the vector path is configured to be uniquely referenced by a vector path identifier.

13. A non-transitory computer-readable medium storing executable instructions, which when executed by a processing device, cause the processing device to perform operations comprising:

receiving, at a first client application of a plurality of client applications, a command corresponding to an input delta of a vector path for a graphical design, the command including a component defining a type, and attributes, of a vector graphics entity, wherein the attributes are stored in a sparse set providing spatial coherence;

a step for serially merging, the input delta and at least one additional delta from at least a second client application into a synchronized version of the graphical design corresponding to an editing state of the graphical design; and storing the synchronized version of the graphical design, wherein the synchronized version as stored includes the input delta and the at least one additional delta.

14. The non-transitory computer-readable medium of claim 13, wherein the operation of displaying the graphical design further comprises:

setting a pending version of the graphical design at the first client application to correspond to the synchronized version of the graphical design; and displaying the pending version of the graphical design.

15. The non-transitory computer-readable medium of claim 13, wherein the component includes an entity for the vector path and attributes of the entity for the vector path.

16. The non-transitory computer-readable medium of claim 13, wherein the sparse set further comprises:

a values array;

a sparse array including an index of the values array; and a dense array.

17. The non-transitory computer-readable medium of claim 13, wherein:

any construct within the component is configured to be uniquely referenced by an integer-based unique entity identifier; and the vector path is configured to be uniquely referenced by a vector path identifier.

* * * * *